United States Patent [19]

Hawkins

[11] Patent Number: 4,907,840

[45] Date of Patent: Mar. 13, 1990

[54] COMBINED HASSOCK, NUTCRACKER AND DISPOSAL UNIT

[76] Inventor: Lendsay W. Hawkins, 347 Ronald Dr., Newport News, Va. 23602

[21] Appl. No.: 371,220

[22] Filed: Jun. 26, 1989

[51] Int. Cl.⁴ .............................................. A47C 7/62
[52] U.S. Cl. .................................. 297/193; 297/217; 297/439; 297/182
[58] Field of Search ............... 297/192, 193, 217, 439, 297/182; 30/120.1, 120.2

[56] References Cited

U.S. PATENT DOCUMENTS

| | | |
|---|---|---|
| 2,069,877 | 2/1937 | Fix . |
| 2,509,395 | 5/1950 | Madan ............................ 297/193 X |
| 3,688,825 | 9/1972 | Hall . |
| 3,713,468 | 1/1973 | Walsh . |
| 3,746,391 | 7/1973 | Novak . |
| 3,751,845 | 8/1973 | Van Leeuwen ................ 297/193 X |
| 4,067,607 | 1/1978 | Battles . |
| 4,361,356 | 11/1982 | Tunick . |
| 4,487,135 | 12/1984 | Van Ryn ......................... 297/193 X |
| 4,614,033 | 9/1986 | Morris ................................ 30/120.2 |

Primary Examiner—Peter R. Brown
Attorney, Agent, or Firm—Wallace J. Nelson

[57] ABSTRACT

A combination hassock, nutcracker and disposal kit is disclosed and includes a container 11 having an open and a closed end with a cushioned removable top 15 serving to close the open end. A nutcracker 40 is attached to a part-circular shelf 35 and a pliable shield 42 serves to prevent shell frgments from being expelled from container 11 during a nut cracking procedure. A plurality of screws 37 extend transversely through the sidewall of container 11 to engage the arcurate portion of shelf 35 for retention thereof within container 11. A removable tray 45 is positioned on shelf 35 and serves as a storage area for uncracked nuts, condiments, etc. Discarded shell fragments may be swept or scraped off shelf 35 into lower compartment 39 of container 11 for retention therein until it is convenient to dispose of them. Cushioned removable top 15, shelf 35 and container 11 are each provided with a decorative vinyl coating for aesthetic purposes. One or more handles 21 assist in moving hassock 10 to a desired location and also assist in up-ending container 11 when it is desired to empty the contents therein for disposal. One or more strapes 17 provide a snap-on connection to releasably secure removable top 15 to container 11.

13 Claims, 1 Drawing Sheet

COMBINED HASSOCK, NUTCRACKER AND DISPOSAL UNIT

FIELD OF THE INVENTION

This invention relates generally to an article of furniture and relates specifically to a combined foot stool or hassock having a removable cushioned seat and a hollow interior with a nutcracker and space for storing books or magazines and for retaining cracked nut shells or other debris.

BACKGROUND OF THE INVENTION

Foot stools or hassocks are desirable items of furniture in most households and are particularly useful when lounging and/or watching television, listening to music and the like. Most foot stools or hassocks serve a single purpose, that is, they support the feet when sitting in a relaxed position, or are used as a separate seat. A number of adults and children enjoy snacks, such as pop corn, cracked nuts, and the like while lounging or watching television. When cracking nuts, some of the broken shell fragments frequently end up on the carpet and are difficult to remove. By providing a hassock with a removable top cushion and a hollow interior, a nutcracker may be provided within the the hassock in easy accessible position to be used with a minimum of effort and cleaning up after use. The excess space in the hollow hassock, not occupied by the nutcracker, may serve as a temporary disposal area for the nut shell particles and thereby avoid having the cracked shell fragments trapped in the carpet.

It is therefore an object of the present invention to provide a novel item of furniture that serves as a foot stool or hassock, as well as a nutcracker container and disposal area for cracked nut shells and other debris.

Another object of the present invention is to provide a removable cushioned top for a foot stool or hassock.

A further object of the present invention is to provide a portable foot stool that houses a nutcracker, a serving tray, and serves as a temporary disposal container for cracked nut shells.

An additional object of the present invention is to provide a multi-purpose, light weight, hollow furniture item.

SUMMARY OF THE INVENTION

According to the present invention the foregoing and additional objects are attained by providing a container having a closed and an open end, a removable cushioned top attached to the container via one or more snap-on straps, and a part-circular shelf disposed within and serving to divide the container into an upper and a lower compartment. A nut cracker is attached to the top surface of the shelf so as to be readily accessible to the user when the removable top is removed from the container. A protective shield is also secured to the shelf in juxtaposition to the nut cracker and is used to cover the nut cracker during use thereof to prevent shell particles from accidentally exiting the container and littering the carpeting. The cracked shell parts are discarded into the lower compartment of the container after a nut cracking session and stored therein until it is convenient to empty the container. A removable serving tray is provided on the shelf and is provided with one or more receptacles thereon for storing nuts to be cracked, nut picking tools, condiments, and to receive the extracted nut meats.

The exterior surface of the container and the removable cushioned top are both provided with a decorative and protective, upholstery type, vinyl covering. At least one handle is provided on the exterior of the vinyl covered hassock to facilitate moving and positioning of the hassock, as well as to assist in up-ending the hassock for emptying debris therefrom.

BRIEF DESCRIPTION OF THE DRAWINGS

A more complete appreciation of the invention and many of the attendant advantages thereof will become more readily apparent as the same becomes better understood with reference to the following drawings wherein.

DETAILED DESCRIPTION

Figure 1:
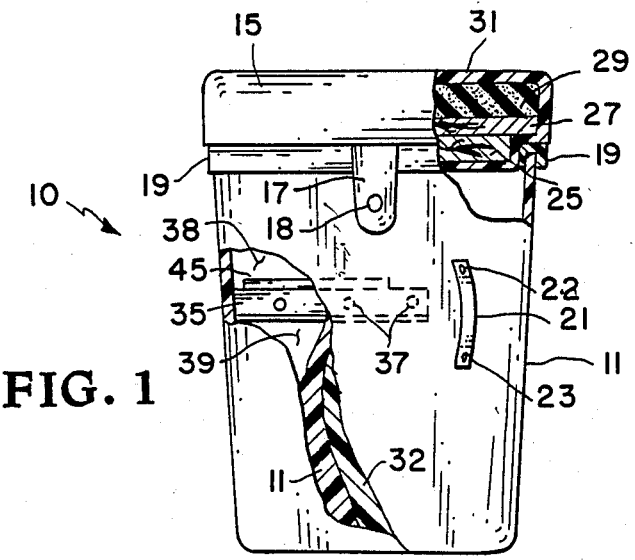
FIG. 1 is a part sectional view of the combined hassock, nut cracker and disposal unit of the present invention.
Figure 2:
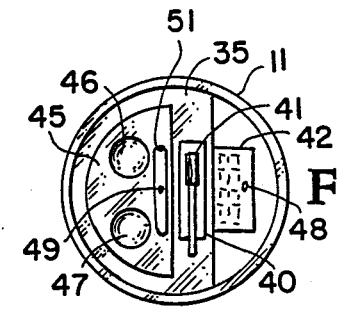
FIG. 2 is a top view of the unit shown in FIG. 1 with the cover removed therefrom.
Figure 4:
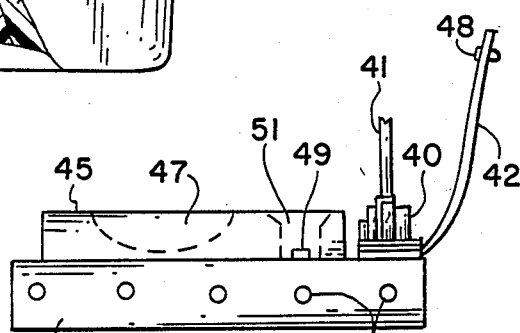
FIG. 4 is a view illustrating the removable serving tray assembly and shelf within the hassock of the present invention.

Referring now to the drawings and more particularly to FIG. 1, the hassock of the present invention is shown and designated generally by reference numeral 10. Hassock 10 includes a plastic container 11 having a closed bottom and an open top end. A removable top 15 serves to close the open end of container 11. Removable top 15 is attached to the exterior of hassock 11 via one or more straps 17 and snap fasteners 18. Strap 17 is formed of vinyl or similar material and stapled, sewed or otherwise permanently attached to removable top 15. Smooth surface or diamond checked pattern vinyl employed in automobile upholstery work is ideally suited for use in practice of the present invention. At least one handle 21 is attached to the exterior sidewall of hassock 10 at substantially the intermediate height thereof via a pair of rivets 22,23. Handle 21 serves as an aid in carrying, moving or positioning hassock 10. Although only one handle is illustrated, obviously two or more handles may be employed if so desired.

Removable top 15 includes a first circular disk 25 formed of plywood or the like, and having a diameter slightly smaller than, and adapted to snugly fit within, the inside diameter of the open end of container 11. A second circular disk 27 formed of the same or similar material, is integrally secured to the top surface of first disk 25. Second disk 27 has a diameter larger than first disk 25 and substantially equal to the outside diameter of the open end of container 11. This increased diameter of second disk 27 thus provides a circumferential lip surface that rests on the open end circumference of container 11. A rim of vinyl material 19 is disposed about and attached to the rim of container 11 to maintain the external covering of vinyl in position and to provide a vinyl surface for the circumferential lip of removable top 15 to rest on. A cushion 29, formed of a circular foam rubber disk and having a thickness substantially equal to the combined thickness of the first and second circular disks 25,27 is secured to the top surface of second disk 27. A decorative vinyl cover 31 is postioned over and attached to the exterior surface of removable top 15 to completely cover the foam cushion 29, and first and second circular disks 25,27.

A part-circular shelf 35 is contained within and attached to the interior sidewall of container 11 via a plurality of screws 37. Screws 37 extend transversely through the sidewall of container 11 to engage the circular portion of shelf 35 and retain the shelf 35 therein. Shelf 35 is formed from a circular disk having essentially the same outside diameter as the inside diameter of container 11. An arcuate segment is cut from the circular disk to leave a part-circular segment for shelf 35. Normally, shelf 35 is formed of a semi-circular segment but when larger shelf area is desired, only a small arcuate segment of the circular disk may be removed to leave shelf 35 extending diametrically or transversely across a major portion of container 11. A decorative vinyl covering 32 is disposed over and attached to the exterior of container 11 to completely cover the exposed surfaces thereof including the heads of screws 37. Vinyl covering 32 is normally, but not required to be, of the same color and pattern as that selected for top covering 31.

Shelf 35 is also provided with a decorative vinyl covering 33. Shelf 35 serves to divide container 11 into an upper and a lower compartment, as designated, respectively, by reference numerals 38,39. The height of shelf 35 within container 11 is not critical but should be selected such that the nut cracker attached thereto is readily accessible when top 15 is removed therefrom. A commercially available nut cracker 40, such for example, a "Rocket" lever actuated nut cracker, is bolted or otherwise conventionally secured to part-circular shelf 35 adjacent the unattached edge thereof. The Rocket nut cracker has a linearly adjustable, threaded jaw and a piston jaw actuated by a pivotal lever 41. Nuts to be cracked are placed between the two jaws and rotation of lever 41 about its pivot point compresses the retained nut for cracking thereof. Lever 41 is threadingly connected to the piston jaw and, when not is use, may be easily removed therefrom and stored on shelf 35 when the height of shelf 35 within container 11 is such that the secured lever would contact, or interfere with the closure of, removable top 15.

The spacing on vinyl covered shelf 35 not occupied by nut cracker 40 provides shelving for a removable tray 45 serving as a storage area for uncracked nuts, nut pickers, condiments, and the like. One or more receptacles 46,47 are attached to or formed in tray 45 and may serve as containers for a suitable flavoring dip, uncracked nuts or for retaining the nut meats extracted from the cracked nuts prior to eating thereof. Tray 45 and the attached receptacles 46,47 are formed of suitable transparent or opaque polyvinyl chloride or other suitable material.

When nut shells or portions thereof are separated from the nut meat they may be easily discarded into the lower compartment 39 with container 11 being emptied at a later time and at the convenience of the user.

Figure 3:
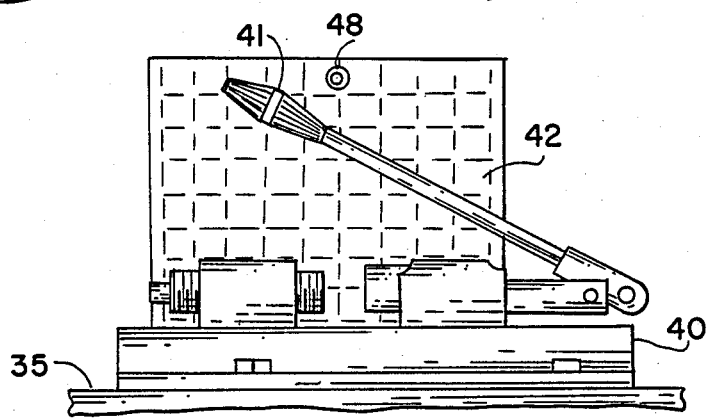
FIG. 3 is an enlarged view of the nut cracker shown in FIG. 2 and illustrating the shell shield therefor that confines all shell particles within the container during a nut cracking procedure.

To prevent shell particles from "flying" off in various directions and onto the carpeting or floor, a pliable shield 42 is provided for nut cracker 40. Shield 42 is secured, by staples, nails, screws, or other conventional attachment mechanism, at one end thereof with the other end being free and adapted to be placed over nut cracker 40 after a nut is positioned therein for cracking. The free end of shield 42 is provided with a snap fastener 48 that engages a mating snap fastener 49 provided on shelf 35. In the preferred embodiment illustrated in FIG. 3, snap fastener 49 is accessible through an opening 51 provided in removable tray 45. When snap fastener element 48 on shield 42 is attached to mating snap fastener element 49, tray 45 is retained in position on shelf 35. When shield 42 is disconnected or unsnapped, tray 45 may be grasped through opening 51 for easy removal from container 11. In FIG. 3 an alternate embodiment for the location of shield 42 is illustrated. In this embodiment shield 42 is attached to the top of shelf 35 adjacent tray 45 with snap fastener 48 thereon adopted to engage a mating snap fastener (not shown) located beneath the edge of shelf 35.

Shelf 35 is normally attached within container 11 such that upper compartment 38 occupies no more than one-quarter of the volume of container 11 while lower compartment 39 occupies essentially three-quarters of the container volume. This location positions nut cracker 40 in easy reach to the user while maintaining an adequate clearance between shelf 35 and removable top 15 to permit storage of unshelled nuts, salt and/or other seasoning containers and the like. Also, adequate volume is available in lower compartment 39 to house one or more magazines, books or newspapers, as well as several days of accumulated nut shells or hulls without need of emptying thereof.

The operation of the invention is believed apparent from the above description. Hassock 10 is located near the user's favorite chair for resting his/her feet thereon, to provide an extra or alternate seat, a receptacle for newspapers, magazines or books and a ready supply of snacks, particularly of the nut variety. When a cracked or shelled nut is desired, it is taken from the storage shelf 35 and placed in lever actuated nut cracker 40, after removal of shield 42 therefrom. Shield 42 may then be positioned over the nut to be cracked and held in position by one hand of the user or, the weight of the shield alone may be adequate to confine flying shell particles within container 11 during the cracking procedure. After cracking the nut, shield 42 is flipped out of contact with the nut cracker, the nut meat recovered and excess shell or hull debris scraped or pushed over the edge of shelf 35 into lower compartment 39. Nut cracker 40 is then ready to crack another nut, with all debris from the cracking operation maintained out of sight and out of the way of the user. When the user has eaten all the nuts desired, there is no immediate clean-up required and removable top 15 may be positioned again to cover container 11 leaving the hassock neat in appearance with no visible evidence of the nut cracking procedure having taken place.

Although the invention has been described relative to a specific embodiment therreof, it is not so limited and there are numerous variations and modifications that will be readily apparent to those skilled in the art in the light of the above teachings. For example, although the specific embodiment described herein employs only one strap connection for removable top and container 11, and only one handle attached to container 11 for assisting in portability thereof, obviously two or more straps and/or handles may be employed when so desired.

Also, different color vinyl may be employed for covering top 15 shelf 35 and container 11 and/or providing trim to the top and/or bottom exterior of container 11, or the same color vinyl may be employed for each of these components, as so desired. In lieu of the vinyl covering, suitable fabric or leather may be employed as the covering material. Also, in lieu of rivets 22,23 to attach handle 21, suitable screws or bolts may be employed to attach handle 21 to container 11. Although plywood was employed for constructing first and second circular disks 25,27 and shelf 35 in the preferred embodiment described, obviously, one or more of these components may be constructed of plastics, composites, solid wood or the like, without departing from the spirit or scope of the present invention. Similarly, other conventional connecting devices may be employed in lieu of screws 37 to connect shelf 35 to container 11.

These and other modifications may be made to the preferred embodiment described herein without departing from the spirit and scope of the appended claims. Thus, the invention may be practiced other than as specifically described herein.

What is claimed as new and desired to be secured by Letters Patent of the United States is:

1. A combination furniture item and a waste disposal kit comprising in combination:
   a container having a closed bottom end and an open top end,
   a removable top for said container,
   means releasably securing said removable top to an exterior surface of said container,
   shelf means disposed within and dividing said container into an upper and a lower compartment,
   said shelf means being parallel with and spaced from said closed bottom end of said container and extending at least one-half the diameter of said container, and
   nut cracker means attached to said shelf and accessible through said open end of said container when said removable top is removed therefrom, whereby when nuts are cracked by said nutcracker, the waste nut hulls or shells may be swept off of said shelf into said lower compartment for subsequent disposal thereof.

2. The combination of claim 1 wherein said removable top includes a first circular disk disposed within said open top of said container, a second circular disk attached to said first circular disk and having a circumferential lip resting on said open top end of said container, and a foam rubber cushion layer attached to said second circular disk.

3. The combination of claim 1 wherein said cushioned top surface area of said removable top serves as a foot stool or seat when positioned to close said open top of said container and including a decorative vinyl cover means for all surfaces of said removable top and for the exterior of said container.

4. The combination of claim 1 wherein said means releasably securing said removable top to an exterior surface of said container includes at least one strap element having a first end attached to said removable top and a second end provided with a snap fastener and releasably attached to a mating snap fastener disposed on the exterior of said container.

5. The combination of claim 1 wherein said shelf means comprises a substantially semi-circular wooden shelf having an arcuate section and a section diametrically extending across the interior of said container, a plurality of attachments extending through the exterior sidewall of said container into said arcuate section of said shelf to attach said shelf to said container.

6. The combination of claim 1 wherein said removable top comprises a first circular layer of substantially the same outside diameter as the inside diameter of said container, a second circular layer having an outside diameter of substantially the same diameter as the exterior diameter of said container to thereby form a circumferential lip surface above said first circular layer, said circumferential lip surface adapted to rest on the circumference of said open end of said container when said removable top is positioned thereon, a third circular layer of foam rubber having an exterior diameter substantially equal to that of said second circulary layer, said third circular layer of foam rubber having thickness approximately twice that of the combined thickness of said first and said second circular layers, and a vinyl covering attached to and enclosing said first, said second and said third circular layers.

7. The combination of claim 1 including handle means disposed on the exterior of said container to facilitate movement thereof for positioning the furniture item or to empty accumulated nut shell or other debris collected within said container.

8. The combination of claim 1 wherein said container comprises a plastic bucket type container and said removable top is provided with a cushioned top surface, said cushioned top surface and said container each being provided with a vinyl covering thereon and when said removable top is positioned on said container, the combination furniture item has a height sufficient to serve as a foot stool or hassock.

9. The combination of claim 1 wherein said shelf means includes a storage area for storing a supply of nuts to be cracked by said nut cracker and at least one receptacle for depositing nut meats obtained from cracking the nuts.

10. The combination of claim 1 including a removable tray supported on said shelf means, said removable tray having at least one integral receptacle thereon.

11. The combination of claim 10 including shield means attached to said shelf means and serving to cover said nut cracker means during a nut cracking procedure to prevent shell particles from accidently exiting said container.

12. The combination of claim 11 wherein said shield means comprises an elongated pliable sheet, said elongated sheet having one end thereof permanently affixed to said shelf and another end thereof releasably attached to said shelf.

13. The combination of claim 12 wherein said removable tray includes an opening therein, a snap fastener attached to said shelf and positioned within said opening of said removable tray, a mating snap fastener disposed on said another end of said elongated sheet for releasably attaching said sheet to said shelf to thereby retain said removable tray on said shelf when said snap fastener on said sheet is attached to said snap fastener on said shelf.

* * * * *